(12) United States Patent
Jeong

(10) Patent No.: US 7,575,281 B2
(45) Date of Patent: Aug. 18, 2009

(54) RECLINER REGULATING STRUCTURE OF REAR SEAT FOR VEHICLE

(75) Inventor: Chan Ho Jeong, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/650,262

(22) Filed: Jan. 4, 2007

(65) Prior Publication Data
US 2008/0106135 A1 May 8, 2008

(30) Foreign Application Priority Data
Nov. 7, 2006 (KR) .................... 10-2006-0109676

(51) Int. Cl.
*B60N 2/02* (2006.01)
(52) U.S. Cl. .............. 297/367; 297/354.1; 297/361.1; 297/366; 297/341; 297/378.12
(58) Field of Classification Search .......... 297/354.1, 297/361.1, 366
See application file for complete search history.

(56) References Cited

U.S. PATENT DOCUMENTS

| | | | | | |
|---|---|---|---|---|---|
| 3,890,001 | A | * | 6/1975 | Tumer | 297/341 |
| 5,100,092 | A | * | 3/1992 | Sovis | 248/429 |
| 5,352,019 | A | * | 10/1994 | Bauer et al. | 297/341 |
| 5,393,116 | A | * | 2/1995 | Bolsworth et al. | 296/65.03 |
| 5,626,392 | A | * | 5/1997 | Bauer et al. | 297/341 |
| 5,873,631 | A | * | 2/1999 | Peck et al. | 297/378.11 |
| 5,927,809 | A | * | 7/1999 | Tame | 297/341 |
| 6,048,030 | A | * | 4/2000 | Kanda et al. | 297/341 |
| 6,644,730 | B2 | * | 11/2003 | Sugiura et al. | 297/15 |
| 6,698,835 | B2 | * | 3/2004 | Kojima et al. | 297/344.1 |
| 6,860,560 | B2 | * | 3/2005 | Chiu et al. | 297/367 |
| 6,860,562 | B2 | * | 3/2005 | Bonk | 297/378.12 |
| 7,011,370 | B2 | * | 3/2006 | Jeong | 297/367 |
| 7,017,993 | B2 | * | 3/2006 | Niimi et al. | 297/341 |
| 7,066,521 | B2 | * | 6/2006 | Jung et al. | 296/65.13 |
| 7,134,703 | B2 | * | 11/2006 | Jeong | 296/65.03 |
| 7,152,923 | B2 | * | 12/2006 | Charras et al. | 297/378.12 |
| 7,255,398 | B2 | * | 8/2007 | Tokui et al. | 297/367 |

(Continued)

FOREIGN PATENT DOCUMENTS

JP    10-194020    7/1998

(Continued)

*Primary Examiner*—Katherine W Mitchell
*Assistant Examiner*—Philip S Kwon
(74) *Attorney, Agent, or Firm*—Edwards Angell Palmer & Dodge LLP; Peter F. Corless

(57) ABSTRACT

A recliner regulating structure of a rear seat for a vehicle is provided comprising: comprising: a reclining part mounted to a side of a seat back frame and operated by an operating lever installed to an upper end of the seat back such that angle of a seat back can be regulated in a state that a lock gear provided to a side of a seat back frame is unlocked from a sector gear by a first cable; a linkage part which is mounted to the seat back frame and is operated by an engagement with a rotation of the lock gear; a rotating operation part which is connected to the linkage part and receives an operation range of the lock gear so as to be rotated; and a stopper part limiting an operation of the rotating operation part.

5 Claims, 7 Drawing Sheets

U.S. PATENT DOCUMENTS

| | | | |
|---|---|---|---|
| 2003/0102705 A1* | 6/2003 | Pejathaya et al. | 297/378.12 |
| 2004/0075324 A1* | 4/2004 | Rausch et al. | 297/341 |
| 2004/0124684 A1* | 7/2004 | Bonk | 297/378.12 |
| 2005/0029851 A1* | 2/2005 | Yamada | 297/341 |
| 2006/0061175 A1* | 3/2006 | Beneker et al. | 297/341 |
| 2007/0096530 A1* | 5/2007 | Ohba et al. | 297/367 |
| 2008/0042481 A1* | 2/2008 | Ishikawa | 297/367 |

FOREIGN PATENT DOCUMENTS

| | | |
|---|---|---|
| JP | 11-222057 | 8/1999 |
| JP | 2003-291695 | 10/2003 |
| JP | 2004-155228 | 6/2004 |

\* cited by examiner

[FIG. 5]
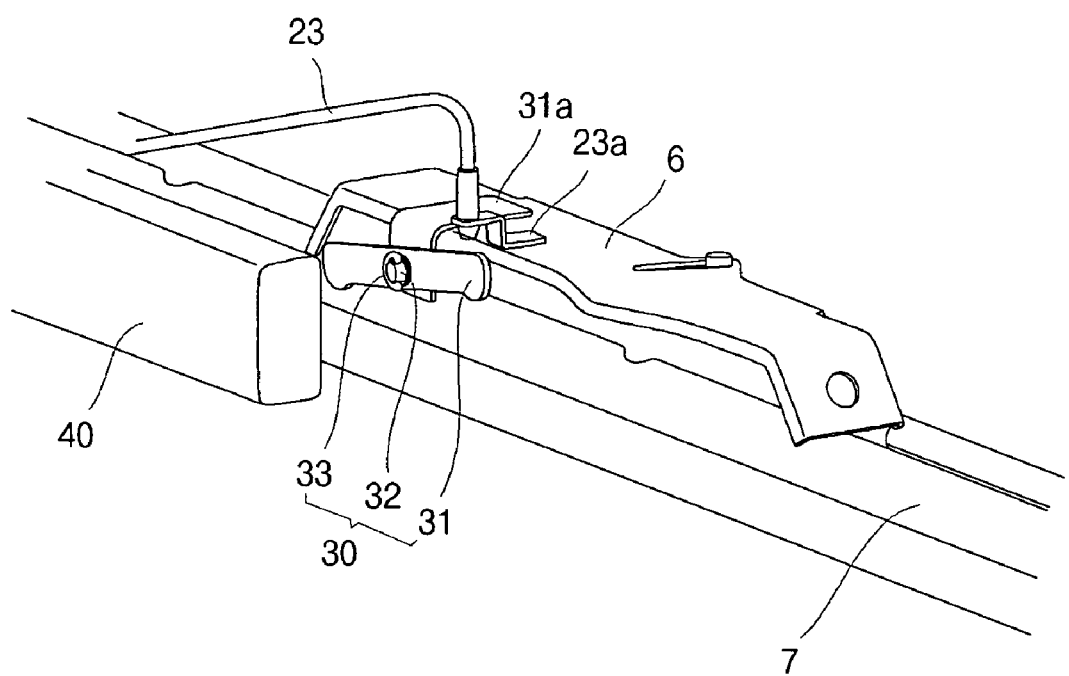

【FIG. 6】 (Prior Art)
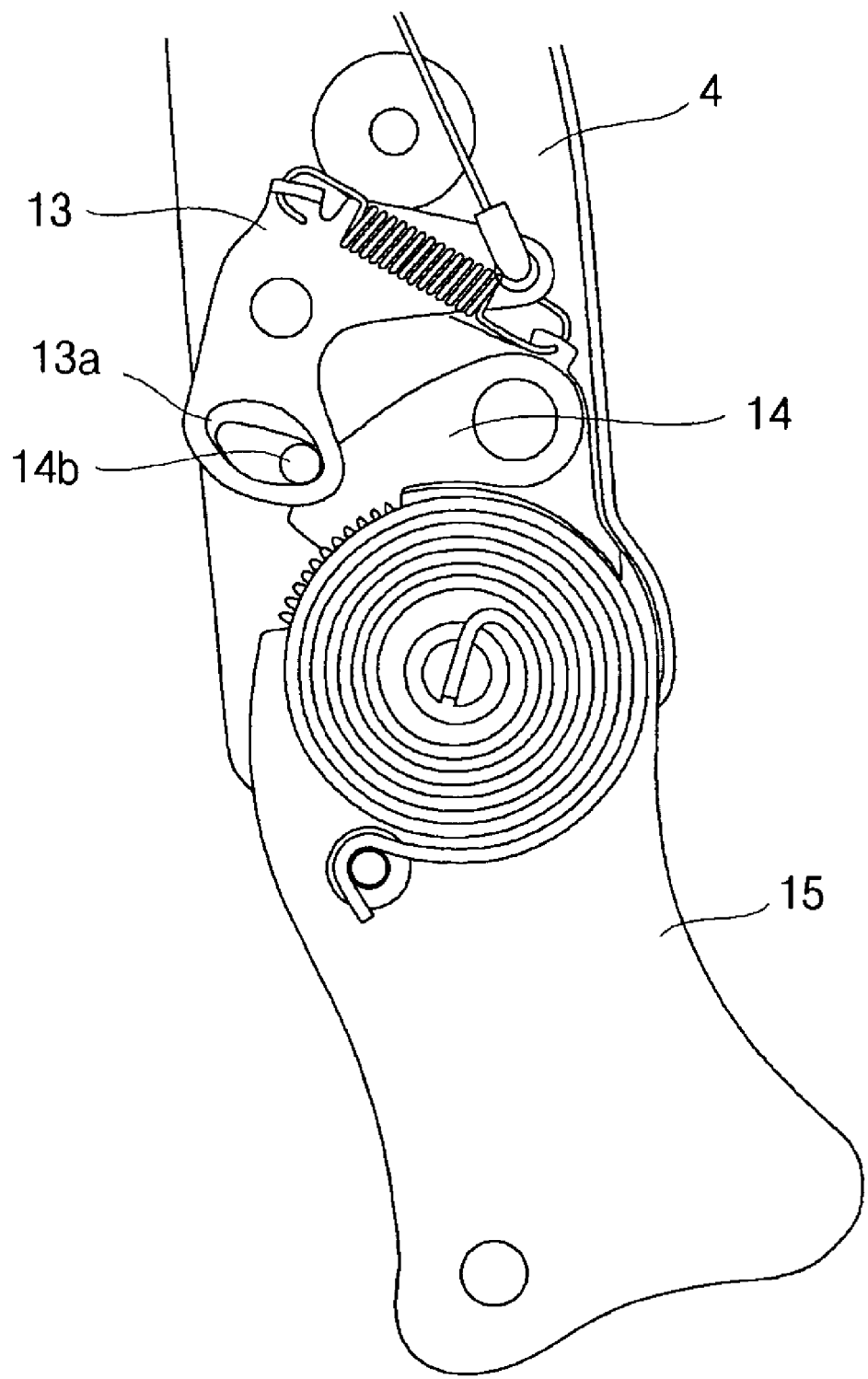

RECLINER REGULATING STRUCTURE OF REAR SEAT FOR VEHICLE

CROSS-REFERENCE TO RELATED APPLICATION

This application claims priority to and the benefit of Korean Patent Application No. 10-2006-0109676 filed in the Korean Intellectual Property Office on Nov. 7, 2006, the entire contents of which are incorporated herein by reference.

BACKGROUND OF THE INVENTION (a) Field of the Invention

The present invention relates to a recliner regulating structure of a rear seat for a vehicle.

(b) Background Art

Generally, a vehicle seat includes a seat cushion which is fixed to a vehicle body, a seat back which is rotatably connected to the seat cushion, and a slide track which is configured to move the seat forward and rearward.

In particular, the seat back is rotatably connected to a rear end of the seat cushion by a recliner, and an angle of the seat back can be regulated by the recliner.

The recliner is installed to both sides of the seat and connects a lower end of the seat back and a rear end of the seat cushion, and the seat back is locked or unlocked in response to rotation of an operation lever.

In order to regulate an angle of the seat back, the operation lever would thus firstly be manipulated.

FIG. 6 shows a conventional recliner regulating structure of a vehicle and a recliner structure used in a multi purpose vehicle (MPV).

In the recliner structure of a rear seat for an MPV, unlike a conventional recliner structure, an operating lever 11 is mounted to an upper end of a seat back 2, and a reclining part 10 is operated by an engagement with a first cable 12.

The reclining part 10 includes a connecting bracket 13, a lock gear 14 and a sector gear 15. The connecting bracket 13 is connected to the first cable 12 at a side of a seat back frame 4. The lock gear 14 and sector gear 15 are locked or unlocked by a rotating operation of the connecting bracket 13.

The connecting bracket 13 and the lock gear 14 are rotatably connected to the seat back 2, and the sector gear 15 is fixed to the seat cushion frame 5.

Teeth 14a and 15a are formed in the lock gear 14 and sector gear. The teeth 14a and 15a are engaged with one another in a lock state or are disengaged from one another in an unlock state.

The lock gear 14 which is locked to or unlocked from the sector gear 15 includes a guide pin 14b which moves along a guide hole 13a of the connecting bracket 13.

However, in the MPV, fourth array seats are positioned in a narrow space, so that there is a limit in regulation amount of a recliner of the rear seat 1 at the hindmost.

That is, in regulating the recliner of the rear seat 1, a headrest of the rear seat 1 is interfered by a rear glass. Furthermore, the head of an occupant may contact the rear glass so that the occupant head may be damaged in the event of a rear crash.

In order to solve this problem, some MPVs are designed such that the recliner of the rear seat 1 is not regulated. This may cause inconvenience, however.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to provide a recliner regulating structure of a rear seat for a vehicle in which reclining operation of a rear seat cannot be preformed at the hindmost position of the rear seat and reclining operation can be performed only after the rear seat is forwardly moved by more than a specific distance.

In one aspect, the present invention provides a recliner regulating structure of a rear seat for a vehicle comprising: a reclining part mounted to a side of a seat back frame and operated by an operating lever installed to an upper end of the seat back such that angle of a seat back can be regulated in a state that a lock gear provided to a side of a seat back frame is unlocked from a sector gear by a first cable; a linkage part which is mounted to the seat back frame and is operated by an engagement with a rotation of the lock gear; a rotating operation part which is connected to the linkage part and receives an operation range of the lock gear so as to be rotated; and a stopper part limiting an operation of the rotating operation part.

Preferably, an operating limit part is further provided in the lock gear and the sector gear such that an angle of the seat back is regulated within a predetermined angle.

In a preferred embodiment, the operation limit part may comprises: a lock gear unlock pin which is protruded from a front surface of the lock gear such that the lock gear does not lock to the sector gear within a specific distance by mutual interference; and a lock gear stopper which is mounted to the sector gear so as to hinder an operation range of the lock gear unlock pin.

In such embodiment, the lock gear stopper may preferably be protruded above teeth of the sector gear and an upper surface of the lock gear stopper may preferably be formed to be parallel with an operating locus of the lock gear unlock pin so as to be interfered with the lock gear unlock pin.

Suitably, an interference range of the lock gear unlock pin with respect to the lock gear stopper may be 5 to 25° where the seat back is not reclined.

In another preferred embodiment, the linkage part comprises: a first bracket which is fixed to the seat cushion frame at a shaft thereof and is operated by an engagement with a rotation of the lock gear; a second bracket which is fixed to the first bracket by a pin and is fixed to a seat cushion frame of a lower end of the first bracket so as to rotate in a direction opposite to a rotating direction of the first bracket; and a second cable which is connected to the second bracket and transmits precise force to the rotating operation part through a cable fixing bracket.

In such embodiment, the rotating operation part can be a rotating bar which is mounted to a side of a leg frame in a horizontal direction with respect to a rotating axis so as to rotate using a second cable which is finally connected to the linkage part as a medium.

Preferably, a return spring may be connected to the rotating bar at a line of the rotating axis so as to provide elastic force for maintaining the rotating bar to be horizontal.

In the above preferred embodiments, the stopper may be extended from a rear end of the rear seat to a front end thereof such that the rotating bar cannot rotate in a specific range.

In another aspect, motor vehicles are provided that comprise a described recliner regulating structure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present recliner regulating structures will be particularly useful with a wide variety of motor vehicles.

Other aspects of the invention are discussed infra.

BRIEF DESCRIPTION OF THE DRAWINGS

The present invention will be better understood from reading the description which follows, given by way of non-limiting example, with reference to the attached drawings.

FIG. 5 is a drawing showing operation state of the rotating operation part of a recliner regulating structure of a rear seat for a vehicle according to an exemplary embodiment of the present invention.

FIG. 6 is a perspective view of a conventional recliner regulating structure of a rear seat for a vehicle.

Figure 1:
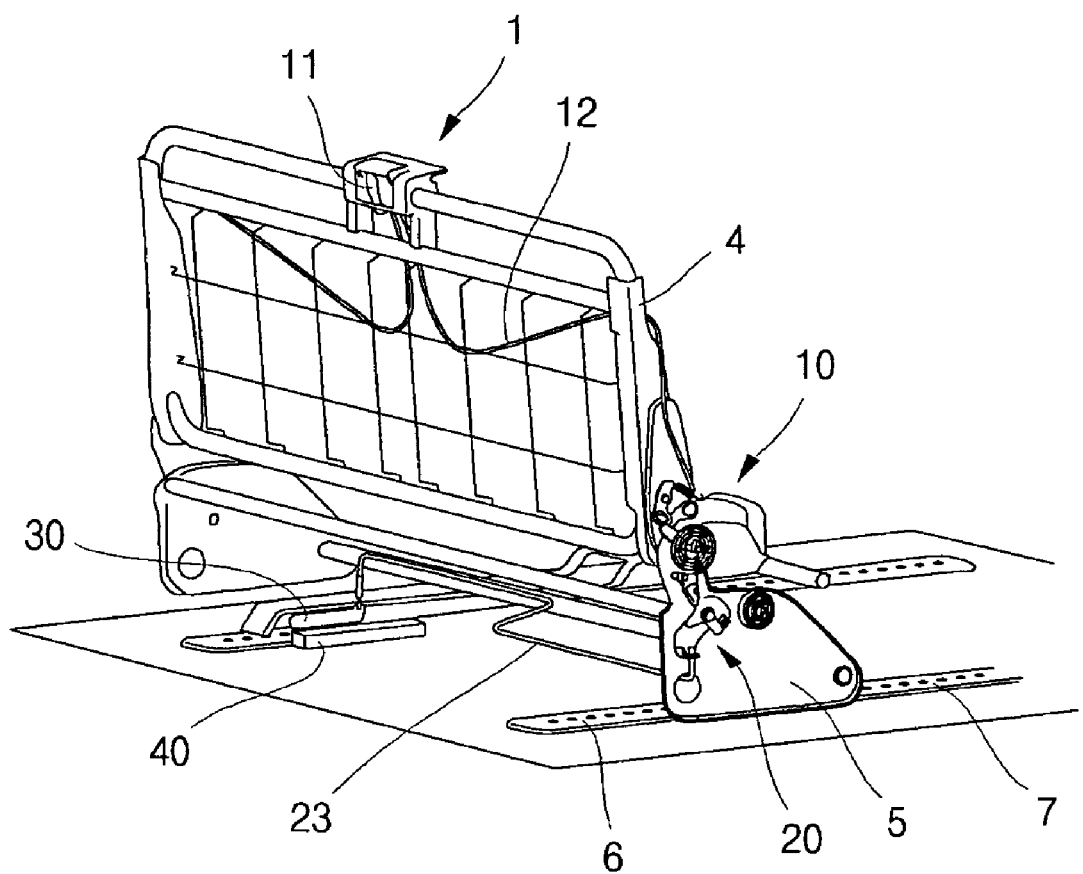
FIG. 1 is a perspective view of a recliner regulating structure of a rear seat for a vehicle according to an exemplary embodiment of the present invention.

Reference numerals set forth in the Drawings includes reference to the following elements as further discussed below:

| | |
|---|---|
| 10: reclining part | 11: operating lever |
| 12: first cable | 13: connecting bracket |
| 14: lock gear | 15: sector gear |
| 20: linkage part | 21: first bracket |
| 22: second bracket | 23: second cable |
| 24: pin | 30: rotating operation part |
| 31: rotating bar | 32: rotating shaft |
| 33: return spring | 40: stopper |
| 50: operation limit part | 51: lock gear unlock pin |
| 52: lock gear stopper | |

DETAILED DESCRIPTION

As discussed above, in one aspect, the present invention provides a recliner regulating structure of a rear seat for a vehicle, comprising: a reclining part mounted to a side of a seat back frame and operated by an operating lever installed to an upper end of the seat back such that angle of a seat back can be regulated in a state that a lock gear provided to a side of a seat back frame is unlocked from a sector gear by a first cable; a linkage part which is mounted to the seat back frame and is operated by an engagement with a rotation of the lock gear; a rotating operation part which is connected to the linkage part and receives an operation range of the lock gear so as to be rotated; and a stopper part limiting an operation of the rotating operation part.

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Figure 2:
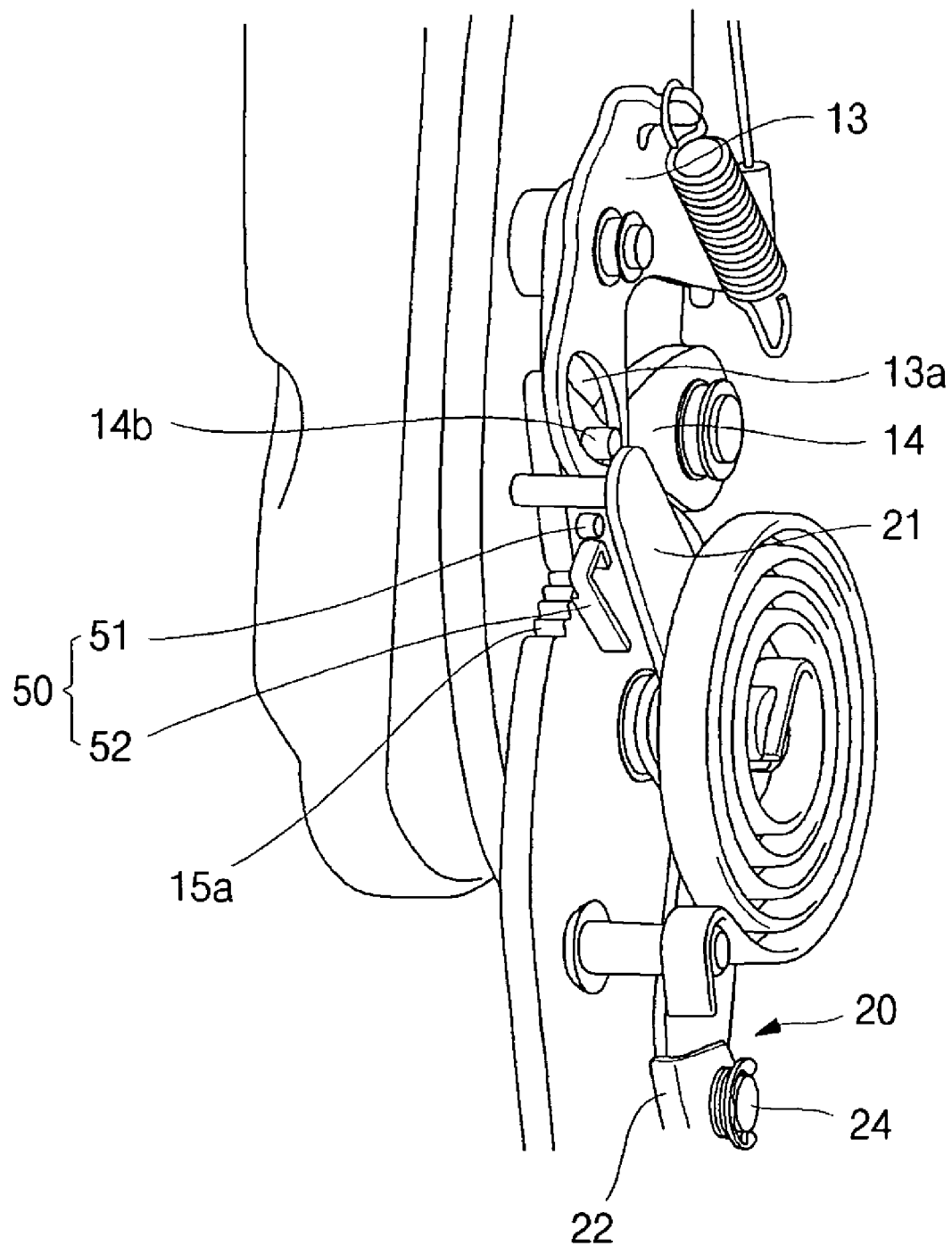
FIG. 2 is a perspective view of a reclining part and a linkage part of a recliner regulating structure of a rear seat for a vehicle according to an exemplary embodiment of the present invention.
Figure 3:
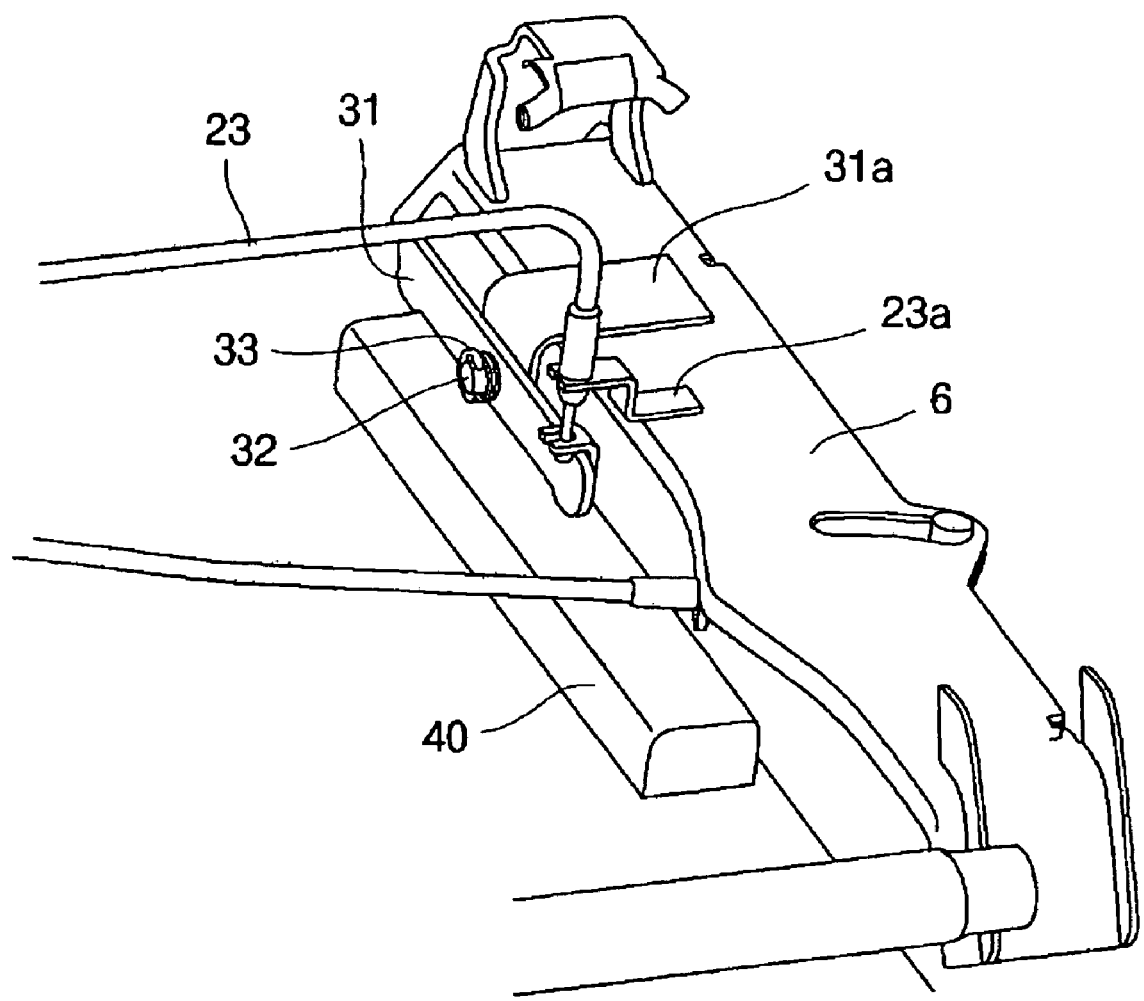
FIG. 3 is a perspective view of a rotating operation part of a recliner regulating structure of a rear seat for a vehicle according to an exemplary embodiment of the present invention.

FIG. 1 is a perspective view of a recliner regulating structure of a rear seat for a vehicle according to an exemplary embodiment of the present invention, FIG. 2 is a perspective view of a reclining part and a linkage part of a recliner regulating structure of a rear seat for a vehicle according to an exemplary embodiment of the present invention, and FIG. 3 is a perspective view of a rotating operation part of a recliner regulating structure of a rear seat for a vehicle according to an exemplary embodiment of the present invention.

A rear seat 1 which is positioned near a rear glass of an MPV is configured not to be reclined at a hindmost position thereof. According to the preferred embodiment of the present invention, the rear seat 1 is configured such that reclining regulation of the rear seat 1 according to a predetermined position is possible when the rear seat 1 moves forward more than by a specific distance, and in particular, reclining regulation is performed within a predetermined angle.

A reclining part 10, a linkage part 20, and a rotating operation part 30 for realizing an embodiment of the present invention will be explained with reference to FIG. 1 to FIG. 3.

The reclining part 10 mounted to a side of a seat back frame 4 is operated by an engagement with an operating lever 11 by a first cable 12, and angle of the seat back 2 can be regulated in a state that a lock gear 14 is unlocked from a sector gear 15.

In the case of regulating an angle of the seat back 2, the lock gear 14 which is fixed to the seat back frame 4 at a shaft thereof moves in an operation direction of the seat back 2, i.e., in a left direction in the drawing. At this time, a first bracket 21 which is fixed to a seat cushion frame 5 at a shaft thereof is operated by an engagement with the rotation of the lock gear 14. A second bracket 22 which is connected to the first bracket 21 by a pin 24 and is fixed to the seat cushion frame 5 at a lower end of the first bracket 21 at a shaft thereof rotates in a direction opposite to a rotating direction of the first bracket 21. As a result, a second cable 23 which is connected to the second bracket 22 is raised.

At this time, as shown in FIG. 3, the second cable 23 is extended to a lower end of the rear seat 1, and an end thereof is connected to a side of a rotating operation part 30. Preferably, the rotating operation part 30 is a rotating bar 31 mounted to a leg frame 6 of the rear seat 1 in a specific length.

In more detail, the rotating bar 31 is connected to a side of the leg frame 6 by a rotating bar fixing bracket 31a. The rotating bar 31 is horizontally disposed with respect to a rotating axis 32, and a return spring 33 for providing elastic force so as to maintain a horizontal position is fixed to an axis line thereof. The second cable 23 transmits precise force to the rotating bar 31 through a cable fixing bracket 23a.

Accordingly, if the second cable 23 is raised by the rotating operation of the first and the second brackets 21 and 22 which are the linkage part 20, the rotating bar 31 rotates with respect to the rotating axis 32 by the second cable 23.

At this time, a stopper part 40 having a specific height and a specific length is extended from a rear end of the rear seat 1 to a front end thereof by a specific length is provided below the rotating bar 31 so as to hinder the rotation of the rotating bar 31. The stopper part 40 limits operations of the linkage part 20 (i.e., the first bracket 21 operated by the lock gear 14) and the rotating bar 31.

More particularly, in the case of rotating the seat back 2 in a rearward direction in order to recline the seat back 2, the unlocked lock gear 14 pushes a fixing pin 21a which is fixed to the first bracket 21. Since the rotating bar 31 which is operated by an engagement with the first bracket 21 cannot rotate by the stopper part 40, the reclining of the seat back 2 is not performed.

As such, the rear seat 1 which is positioned near a rear glass of an MPV is configured not to be reclined at a hindmost position thereof, so a headrest of the rear seat 1 does not interferes with a rear glass, and at the same time, the head of an occupant does not contact the rear glass. On the other hand, if the rear seat 1 move forwardly by more than a specific distance (250 mm) so as to escape from the stopper part 40, the seat back 2 can be reclined.

In an exemplary embodiment of the present invention, an operation limit part 50 for limiting a regulation angle of the reclining in a predetermined angle is provided to the reclining part 10.

In particular, the operation limit part 50 includes a lock gear unlock pin 51 which is protruded on a front surface of the lock gear 14 and a lock gear stopper 52 which is provided to the sector gear 15, and their cooperative operation prevents the lock gear 14 from being locked to the sector gear 15 in a specific range of an operation range of the seat back 2.

At this time, the lock gear stopper 52 which is fixed to a side of the sector gear 15 is protruded over teeth 15a of the sector gear 15, and an upper surface thereof is formed to be parallel with an operation locus of the lock gear unlock pin 51 so as to be interfered with the lock gear unlock pin 51.

Preferably, an interfering rage of the lock gear unlock pin 51 and the lock gear stopper 52 is a range of 5 to 25°, and the seat back 2 is not reclined in this range. The reason for this is that if the seat back 2 is reclined in this range, the rear seat 1 may slide because the pulling amount of the second cable 23 is small.

Accordingly, it is preferred that it is configured that reclining of the seat back 2 cannot be preformed in the interfering range.

Operation principles of a recliner regulating structure of a rear seat for a vehicle according to an exemplary embodiment of the present invention will be explained hereinafter.

Figure 4A:
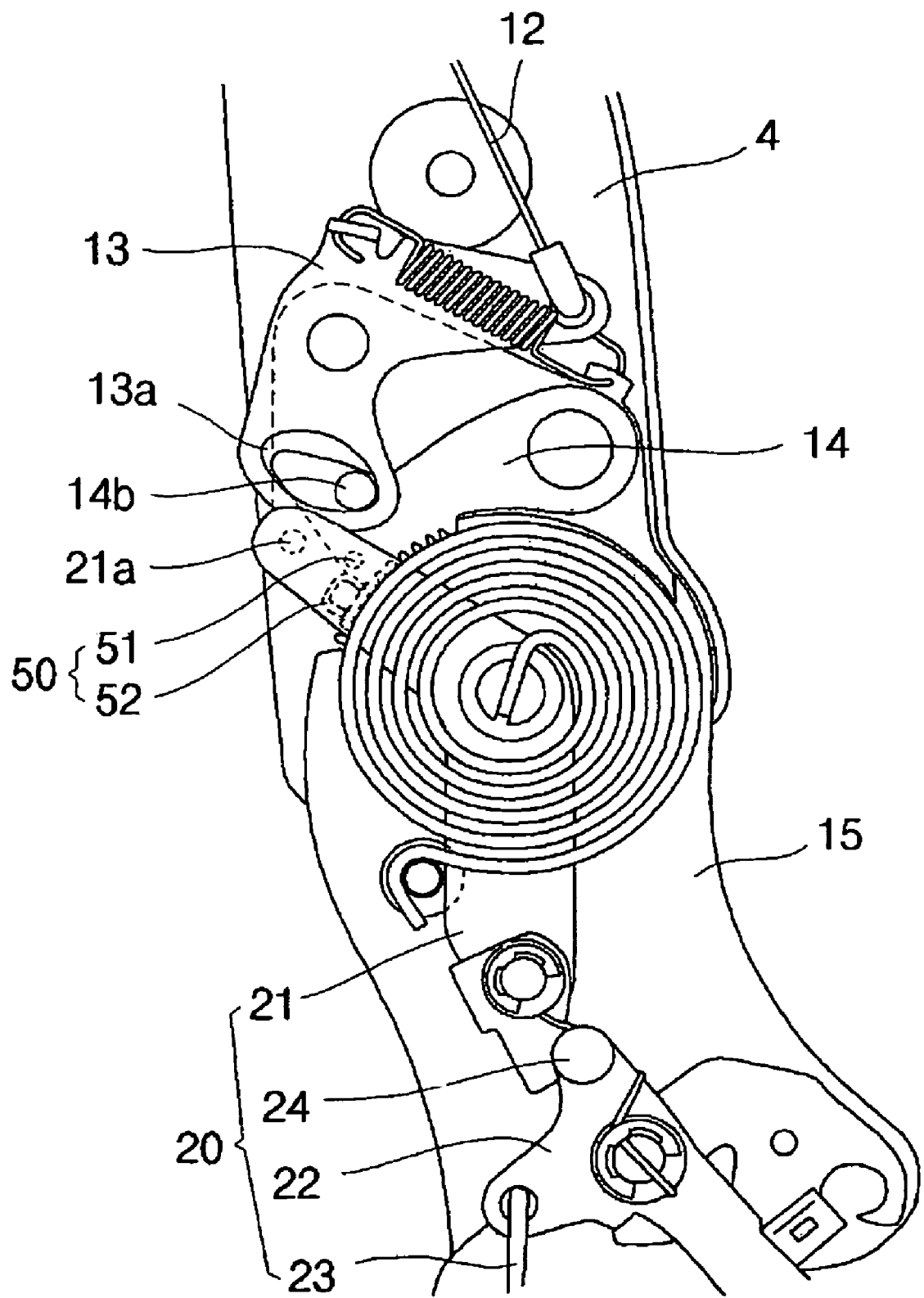
FIG. 4A and FIG. 4B show states before and after operation of the reclining part and the linkage part of a recliner regulating structure of a rear seat for a vehicle according to an exemplary embodiment of the present invention.
Figure 4B:
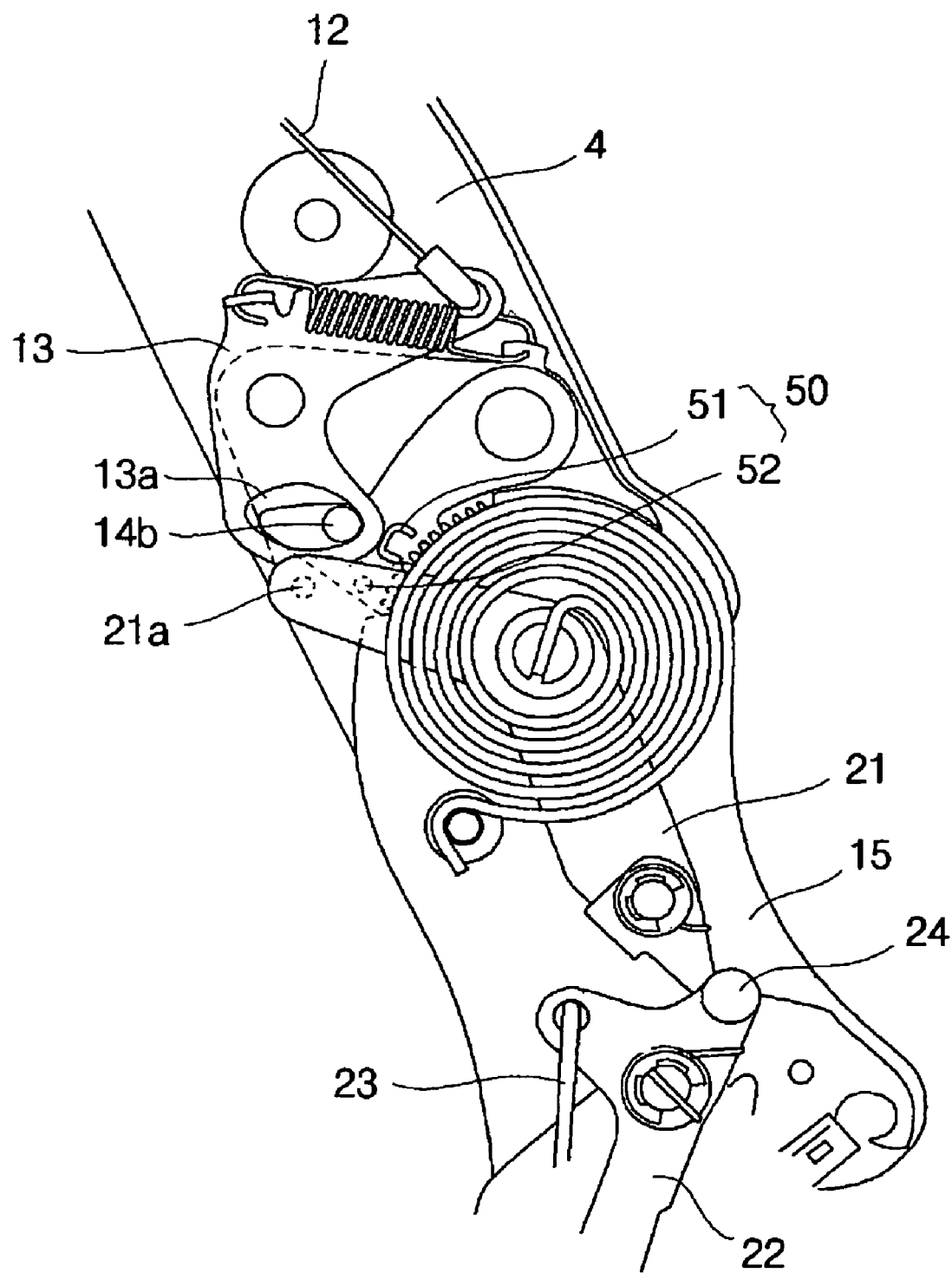

FIG. 4A and FIG. 4B show states before and after operation of the reclining part and the linkage part of a recliner regulating structure of a rear seat for a vehicle according to an exemplary embodiment of the present invention, and FIG. 5 is a drawing showing operation state of the rotating operation part of a recliner regulating structure of a rear seat for a vehicle according to an exemplary embodiment of the present invention.

In the rear seat 1 of an exemplary embodiment of the present invention, the seat back 2 can be reclined only in a range, i.e., a frontal specific range among a forward/rearward moving range of a seat track 7 where the headrest of the rear seat 1 does not interfere with the rear glass and the head of an occupant does not contact the rear glass. As a result, in the case that the first cable 12 which is connected to the operating lever 11 is raised by the rotation of the operating lever 11, the lock gear 14 is unlocked from the sector gear 15 by the rotation of a connecting bracket 13 which is fixed to the seat back frame 4.

At this time, the connecting bracket 13 and the lock gear 14 are operated in a state that a guide pin 14b of the lock gear 14 is inserted into a guide hole 13a of the connecting bracket 13 so that the connecting bracket 13 rotates together with the lock gear 14.

As such, in the unlock state of the lock gear 14, in the case that the rotating bar 31 of the rotating operation part 30 is positioned in an installation region of the stopper part 40, the reclining of the seat back 2 is impossible. On the other hand, in the case that the rotating bar 31 of the rotating operation part 30 is positioned out of the installation region of the stopper part 40, the reclining of the seat back 2 is possible.

Accordingly, when the reclining of the seat back 2 is performed in the unlock state of the lock gear 14, the lock gear 14 pushes the fixing pin 21a which is fixed to the first bracket 21 of the linkage part 20, so that the first bracket 21 rotates.

If the first bracket 21 rotates, the second bracket 22 connected thereto rotates in a direction opposite to a rotating direction of the first bracket 21, and accordingly, the second cable 23 which is connected to the second bracket 22 is raised.

Thus the rotating bar 31 rotates. Since the operation position of the rotating bar 31 is out of the installation region of the stopper part 40, the reclining of the seat back 2 can be smoothly performed.

At this time, since the lock gear 14 is engaged in all regions except the limited region of the sector gear 15, the lock gear 14 can be engaged in all regions except the region of 5 to 25°.

Since the lock gear unlock pin 51 of the lock gear 14 is interfered by the lock gear stopper 52 of the sector gear 15, the lock gear 14 and the sector gear 15 cannot be engaged with one other in that region, but they can be engaged with one another at the region except the region of 5 to 25°.

As described above, according to a recliner regulating structure of a rear seat for a vehicle according to an exemplary embodiment of the present invention, convenience and functionality of the rear seat can be enhanced, and damages to the head of an occupant in the event of a rear crash can be prevented.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A recliner regulating structure of a rear seat for a vehicle comprising:

a reclining part mounted to a side of a seat back frame and operated by an operating lever installed to an upper end of a seat back such that angle of the seat back can be regulated in a state that a lock gear provided to a side of a seat back frame is unlocked from a sector gear by a first cable;

a linkage part which is mounted to a seat cushion frame and is operated by an engagement with a rotation of the lock gear;

a rotating operation part which is connected to the linkage part and receives an operation range of the lock gear so as to be rotated; and a stopper part limiting an operation of the rotating operation part, wherein the stopper part is extended from a rear end of the rear seat to a front end thereof such that the rotating operation part cannot rotate in a predetermined slidable range of the rear seat, wherein an operation limit part is further provided in the lock gear and the sector gear such that an angle of the seat back is regulated within a predetermined angular range, and the operation limit part comprises a lock gear unlock pin which is protruded from a front surface of the lock gear such that the lock gear does not lock to the sector gear within the predetermined angular range; and a lock gear stopper which is mounted to the sector gear so as to interfere with the lock gear unlock pin within the predetermined angular range, and the lock gear stopper is protruded beyond teeth of the sector gear and an upper surface of the lock gear stopper is formed to be parallel with a moving direction of the lock gear unlock pin.

2. The recliner regulating structure of claim 1, wherein the predetermined angular range of the seat back is 5 to 25°.

3. The recliner regulating structure of claim 1, wherein the linkage part comprises:

a first bracket which is fixed to the seat cushion frame at a shaft thereof and is operated by an engagement with a rotation of the lock gear;

a second bracket which is connected to the first bracket by a pin and is fixed to the seat cushion frame at a lower end of the first bracket so as to be rotated in a direction opposite to a rotating direction of the first bracket; and a second cable which is connected to the second bracket and transmits force to the rotating operation part through a cable fixing bracket.

4. The recliner regulating structure of claim 3, wherein the rotating operation part is a rotating bar which is mounted to a side of a leg frame in a horizontal direction with respect to a rotating axis so as to be rotated by means of the second cable which is finally connected to the linkage part.

5. The recliner regulating structure of claim 4, wherein a return spring is connected to the rotating bar at a line of the rotating axis so as to provide elastic force for maintaining the rotating bar to be horizontal.

* * * * *